Nov. 20, 1945.   E. C. AUSTIN   2,389,479
FASTENING DEVICE
Filed Sept. 16, 1943   2 Sheets-Sheet 2
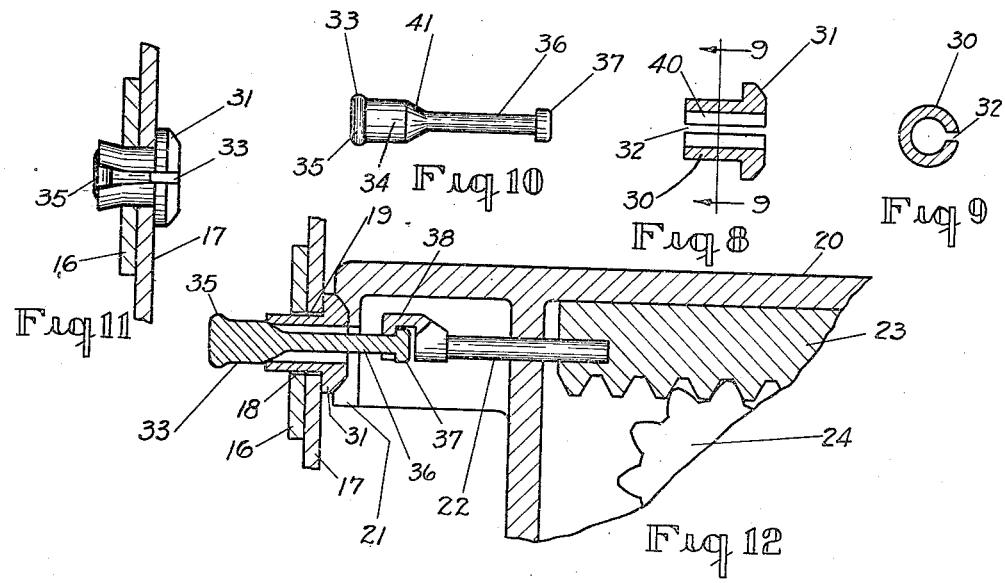
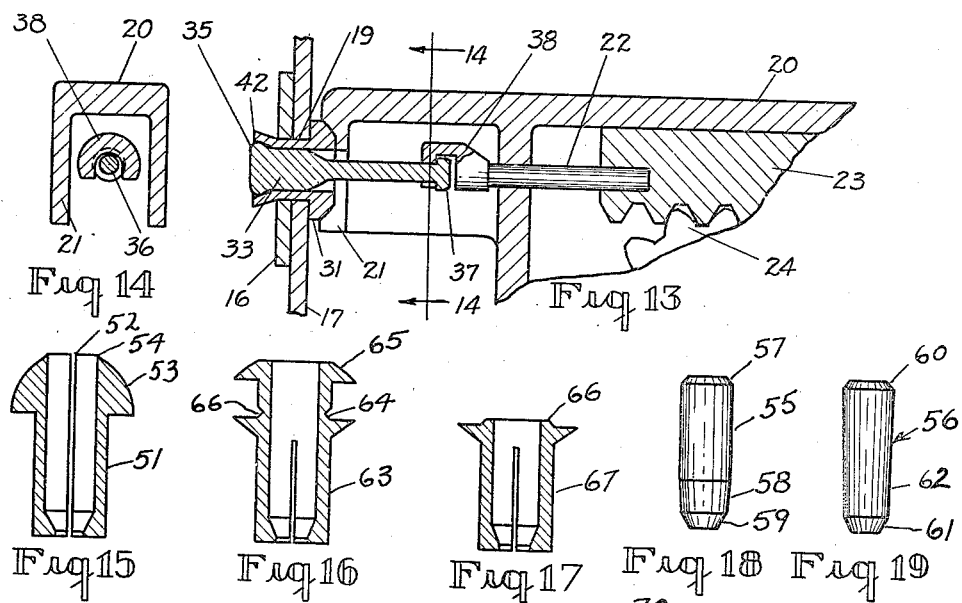
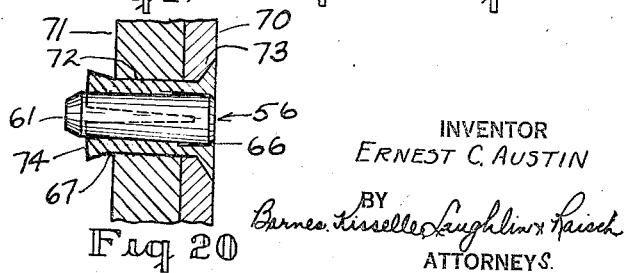
INVENTOR
ERNEST C. AUSTIN
BY
Barnes, Kisselle, Laughlin & Raisch
ATTORNEYS.

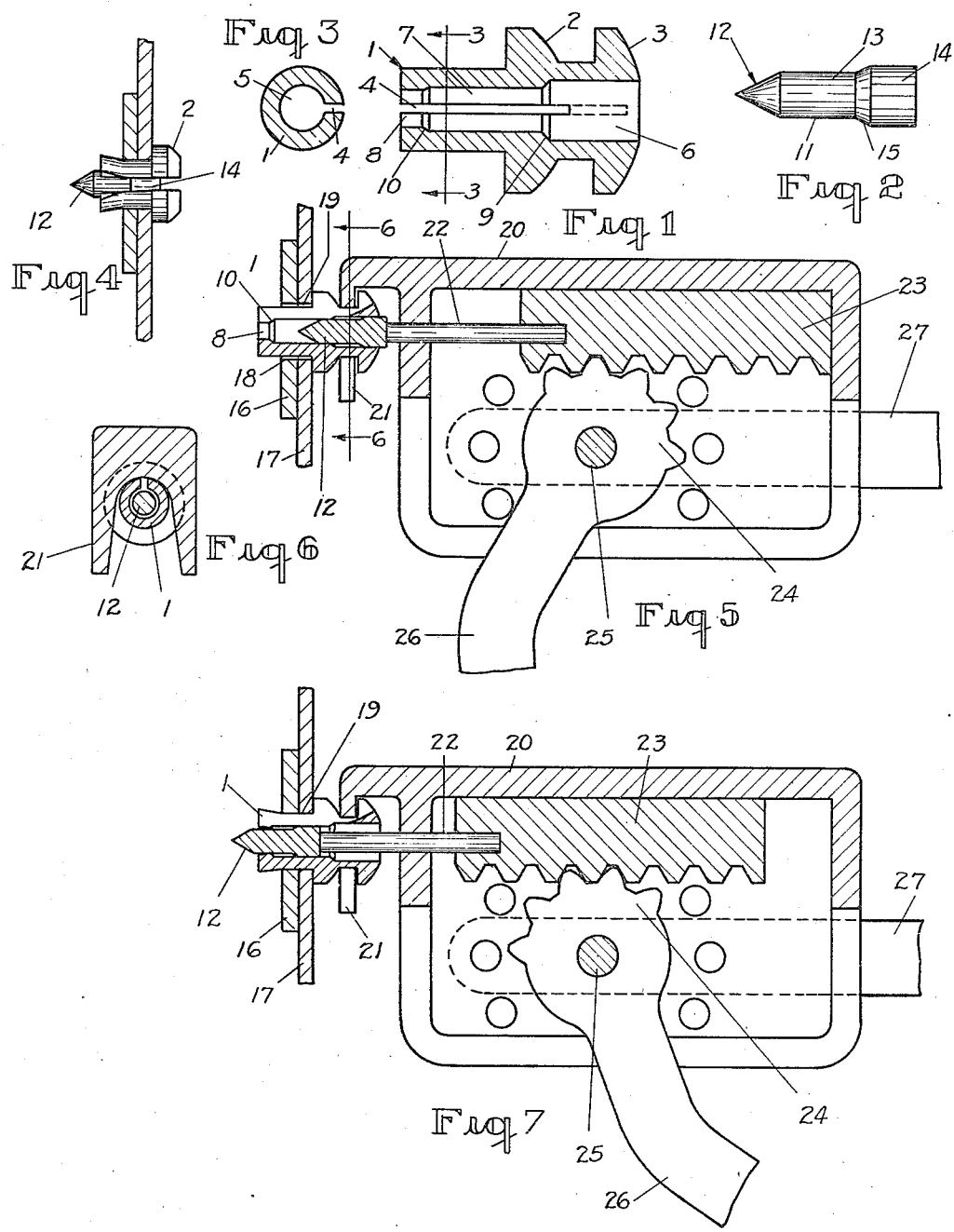

Patented Nov. 20, 1945

2,389,479

UNITED STATES PATENT OFFICE 2,389,479

FASTENING DEVICE

Ernest C. Austin, Los Angeles, Calif.

Application September 16, 1943, Serial No. 502,605

7 Claims. (Cl. 85—40)

This invention relates to a rivet and more particularly to a hollow rivet.

It is the object of this invention to produce a hollow rivet which is adapted for use as a blind rivet so that it can be inserted in the work and clenched into position from one side of the work without any strains being placed on the work.

The invention also contemplates a hollow rivet which can be easily riveted in place and which can be made from a metal or alloy having greater strength and hardness than the metals and alloys commonly used for rivets.

Another object of the invention is that of producing a hollow rivet having a greater sheer strength than rivets presently in use.

In the drawings:

Fig. 1 is a longitudinal section of my rivet.

Fig. 2 shows the tapered drive plug for my rivet.

Fig. 3 is a section along the line 3—3 of Fig. 1.

Fig. 4 shows the rivet in final riveted or assembled relation with the work.

Fig. 5 shows an apparatus for applying the rivet to the work to be joined showing the first step in the installation of the rivet.

Fig. 6 is a section along the line 6—6 of Fig. 5.

Fig. 7 is a sectional view showing the tool for installing the rivet with the rivet in its final position in the work.

Fig. 8 is a longitudinal section of a modified form of the rivet.

Fig. 9 is a section along the line 9—9 of Fig. 8.

Fig. 10 is an elevation of a pull plug used with this type of rivet.

Fig. 11 shows the modified form of rivet in final assembled relation with the work.

Fig. 12 shows a tool for installing the modified form of rivet with the rivet and pull plug in its initial position.

Fig. 13 is a view similar to Fig. 12 but showing the pull plug and rivet in their final installed position.

Fig. 14 is a section along the line 14—14 of Fig. 13.

Figs. 15, 16 and 17 show modified forms of rivets.

Figs. 18 and 19 show modified forms of push plugs for use with the rivets.

Fig. 20 is a sectional view of the modified form of rivet, Fig. 17, in final riveted position in the work with a push plug, such as shown in Fig. 19.

Referring more particularly to the drawings it will be seen that the rivet comprises a tubular shank 1, an integral head 2, and a false or assembly head 3. The shank, head, and preferably the false head, are provided with one slot 4 extending throughout the length of the rivet. The rivet is provided with an opening 5 therethrough. The portion 6 of the opening 5 in the false head has a larger diameter than the portion 7 of the opening in the head and shank and the portion 8 of the opening in the left hand end of shank 1 has a smaller diameter than portion 7. The opening 5 is provided with a tapered portion 9 between portions 6 and 7 of hole 5 and with a tapered portion 10 between portions 7 and 8 of the rivet hole. Tapered portions 9 and 10 are arranged to function with the push or drive plug 11 to expand and clench the rivet in place. The push plug 11 is provided with a tapered end 12, a body portion 13 and a head 14 having a larger diameter than the body 13. The plug 11 is tapered as at 15 between the body 13 and head 14. The rivet and plug can be made from any of the well-known alloys conventionally used for hollow rivets but owing to the slot 4 and the manner of installing the rivet in the work, the rivet can be made from very hard and strong aluminum alloys having a high sheer strength, or even from stainless steel, or iron, brass, etc.

The installation of the rivet is illustrated in Figs. 5 and 7. The work, for example, comprises two sheets of metal 16 and 17 provided with aligned openings 18 and 19. The push plug 11 is inserted in the opening 5 of the rivet. It should be noted that the diameter of the opening portion 7 in the rivet is substantially the same as the external diameter of the body 13 of the push plug and the diameter of opening portion 6 in the rivet is substantially the same as the diameter of the head portion 14 of the push plug. After the push plug is inserted in the rivet, as shown in Fig. 1, the rivet is placed in the hole through the work and the plug driven home to the position shown in Fig. 7. The driving of the plug into the rivet can be accomplished by any suitable tool.

In Figs. 5 and 7 I have shown a particular tool adapted for installing my rivet. This tool comprises a housing 20 having a pair of claws 21 for engaging over the false head 3 of the rivet. A plunger 22 is reciprocably mounted in the housing and fixed at one end to a reciprocating rack 23 which meshes with the teeth of a gear segment 24 pivotally mounted in the housing on pin 25. The gear segment is provided with a handle 26 for rotating the same and housing 20 is provided with a handle 27. It will be seen that when handle 26 is swung counterclockwise, Fig. 5, toward handle 27 that gear segment 24 will act through rack 23 to move plunger 22 to the left. As plunger 22 moves to the left it drives the push plug 11 before it, but the force of the plunger is not transmitted by the rivet to the work 16, 17 because the claws 21 of the tool co-act with the false head 3 to hold the rivet as the push plug 11 is driven home and support the rivet against the force of plunger 22 so that none of the force is taken up by the work. In other words, the claws 21 fit over the neck of the rivet between the head 2 and false head 3 and while the plunger 22 is forcing the drive pin 11 further into the rivet, the neck and false head of the rivet are under tension to take care of the thrust of plunger 22 and relieve the work 16 and 17 from any strain.

As the drive pin 11 is forced further into the plunger the tapered end 12 co-acts with the taper 10 and small opening 8 to spread the end of the slotted rivet to clench or lock the work together. The head 14 and taper 15 on the drive pin 11 co-act with the taper 9 and the opening 7 to spread the body of the rivet. It should be borne in mind that the diameter of head 14 is somewhat greater than the diameter of the hole portion 7. Thus, the drive pin remains permanently in the rivet, as shown in Fig. 7, to lock the same expanded and clenched in the work. After the rivet has been installed in the work the plunger 22 is retracted by swinging handle 26 clockwise from the position shown in Fig. 7 to that shown in Fig. 5 and the tool is disengaged from the rivet false head. The false head of the rivet can be left on if desired or it can be cut or trimmed off as shown in Fig. 4.

The modified form of rivet shown in Figs. 8 to 14 comprises a hollow body 30 having a head 31. Both the head and body having a single longitudinal slot 32 extending through the wall of the rivet from one end to the other. In the modified form of rivet it is proposed to expand the same by means of a pull plug 33 rather than by means of a drive plug such as in the principal form of the invention. The pull plug comprises a body 34 having an enlarged head 35, a stem 36 having a head 37. In installing this form of rivet in the work the same tool is used as shown in Figs. 5 and 7, except that the pair of claws 38 are fixed on the end of plunger 22 and the plunger is moved away from the work to pull the plug through the rivet.

In installing this rivet the pull plug 33 is inserted in the rivet and the rivet and pull plug then inserted in the hole 18, 19 through the work. The claws 38 are now positioned over stem 36 and behind head 37. Claws 21 now back up the head 31 of the rivet. The handle 26 is moved to rotate gear segment 24 clockwise so that rack 23 moves to the right, Fig. 12, so that claws 38 pull on head 37 to draw the pull plug 33 further into the rivet into the position shown in Fig. 13. In this case the claws 21 take the thrust or pull and back up the head of the rivet 31 so that none of the thrust or pull is exerted on the work 16 and 17 which may be thin aluminum sheets such as are commonly riveted together in airplane manufacture. The diameter of body 34 of the pull plug is somewhat greater than the internal diameter of the opening 40 through the hollow rivet. Thus, the tapered surface 41 between the body 34 and stem 36 co-acts with the rivet to expand the body 30 of the same into tight engagement with holes 18, 19 as the plug is drawn further into the rivet and the head 35 of the pull plug spreads out and clenches the end 42 of the rivet to lock the work pieces 16 and 17 between the clenched end of the rivet and the head 31. The pull plug 33 is left in the rivet and serves to lock the hollow rivet in place. As shown in Fig. 13 the pull plug expands the body of the rivet into tight engagement with the openings 18, 19 in the work. After the tool is removed from the pull plug the stem of the pull plug is trimmed off flush with the head of the rivet, as shown in Fig. 11.

It is evident from the above that owing to the single slot in the wall of the rivet that the rivet can be made from a very hard, tough and strong metal or alloy having a high sheer strength and yet clenched in its final position without distorting or placing any thrust or pull on the work. This rivet is also admirably adopted for blind riveting such as occurs in airplane manufacture wherein the rivet cannot be reached for backing up while being clenched.

It will be noted that the rivet, due to the slot through the head, is not air-tight. This is taken care of by an arc-welding operation which has a two-fold object; first, to make the rivet joint air and liquid tight and second, to absolutely lock the plug in place. This may be necessary where extreme fatigue stresses are encountered. The operation is very fast and cheap.

The "slit head" of this rivet provides for the rivet to expand so as to give equal tightness in both, or all sheets, or members. Thus, it provides the maximum resistance to loosening on account of sheer stresses. The slotted rivet allows for equal tightness in all members and a harder, stronger material can be used to make a stronger rivet joint. In cases, however, where only limited strength is required, the slit need not extend through the head.

The plug of either type preferably should be of harder and stronger material or alloy than the shell of the rivet.

In the modification shown in Figs. 15, 16 and 17, the rivet is arranged so that the push plug can be positively locked in position. The modified form of rivet 51 is a cylindrical body having one longitudinal slot 52 extending throughout its length. The head 53 around the outer end of the opening is provided with a flange 54 which can be peened over to lock the push plug in place. Preferably, a push plug 55, Fig. 18, or a push plug 56, Fig. 19, is used with this rivet.

Plug 55 is beveled circumferentially as at 57 around its outer end to accommodate the peened over portion 54 of the rivet body after the plug is driven home. Plug 55 has a slight taper as at 58 and a more abrupt taper as at 59. Plug 56 has its outer end tapered as at 60 to accommodate the peened over edge 54 of the rivet 51 and has its inner or leading end tapered as at 61. The plug 56 also has a slight taper as at 62 from the outer end 60 to the inner end 61.

The modified form of rivet 63, Fig. 16, is substantially the same as the rivet shown in Fig. 1 except that a circumferential groove or cut 64 is provided between the false head 65 and the body of the rivet. After the false head 65 has been removed, a circumferential flange or ridge 66 remains which can be peened over to lock the push plug 55 or 56 in place. The rivet 67, shown in Fig. 17, is identical with that shown in Fig. 16 after the false head 65 has been removed. Thus, rivet 67 can be used either with or without a false head.

With a rivet such as shown in Figs. 15 and 17, the push plugs can be driven home by means of a pneumatic hammer or hand hammer where the work is heavy and rigid enough to withstand this method of applying the rivet to the work.

Fig. 20 shows two panels 70 and 71. Panel 71 is provided with an opening 72 for the rivet and panel 70 is provided with a flared opening 73 for the head of the rivet 67. In driving the plug 56 home the leading end 61 of the plug expands the inner end 74 of the rivet. The ridge 66 is peened over to lock the plug 56 in place. The head of the rivet 67 is flush with the outer face of panel 70.

Where the harder and tougher alliys are used in the rivet, such as shown in the modified forms, Figs. 15 to 17, the plug 56, for example, is arranged so that when it is driven home it will expand the slotted portion of the rivet body into tight engagement with the holes 72 and 73 and clench the inner end 74 of the rivet over the panel 71.

I claim:

1. A rivet assembly comprising a hollow body and head, a slot extending through the wall of the body and for the entire length of the body, the opening in the rivet having a smaller diameter adjacent the end of the body remote from the head than throughout a major portion of the body and throughout the head, a plug adapted to have a force fit in said hollow body and having portions with larger diameters than the diameters of said opening in the rivet whereby upon forcing the plug into said rivet the plug clenches the end of the body remote from the head and springs and locks the body of the rivet into a tight fit with the opening in the work in which the rivet is installed.

2. A rivet comprising a hollow sleeve having a flanged head portion at one end and a clenching portion at the opposite end, a slot extending through the sleeve and head lengthwise thereof from the clenching end through the head, and a plug having a larger diameter than the diameter of that portion of the opening in the sleeve from the head to the opposite end for expanding and springing the slotted rivet into a tight fitting engagement within the opening of the work into which the rivet is fitted and for expanding and clenching the clenching end of said sleeve.

3. A rivet assembly adapted to be assembled to the work from one side of the work comprising a hollow sleeve having a flanged head portion at one end and a clinching portion at its other end, a slot extending lengthwise through the sleeve and head and for the entire length of the same, and a pin member for plugging the interior of said sleeve and for operating said clinching portion from the head end of the rivet, said pin member fitting said sleeve with a drive fit throughout at least the major part of the length of the sleeve to expand the rivet within the opening in which the same is fitted to form a tight joint and to permanently hold the rivet expanded in the opening of the work, and a false head on said rivet by means of which the rivet can be held as the plug is forced to its final position and the work relieved from strain.

4. A hollow rivet adapted to be installed in the work while operating from one side of the work only comprising a hollow body and head, the hollow body having a clenching portion at its end remote from the head, a slot through the hollow body and head extending lengthwise throughout the length of the rivet, a tapered plug having a larger diameter than that portion of the opening through the rivet from the head to the opposite end and adapted to be forced into the rivet to clench the end of the body and expand and lock the slotted body portion into a tight fit within the opening in the work, said plug having a force-fit in said rivet.

5. A hollow rivet including a body having a flanged head, a longitudinal slot through the body and head from one end of the rivet to the other, the opening in the rivet having a larger diameter in the head and throughout a major portion of the body portion than the diameter of the hole adjacent the end of the body remote from the head, and a plug having a force-fit in said hollow rivet, said plug being adapted to be forced into the hollow rivet and having a first portion with a diameter larger than the hole in the clenching end of the body of the rivet and a second portion having a diameter larger than the other portion of the plug and larger than the diameter of the remaining portion of the hole in the body and head whereby when the plug is forced into the rivet it expands and clenches the end of the rivet remote from the head and expands and locks the slotted body portion of the rivet into a tight fit with the opening in the work.

6. A rivet comprising a hollow sleeve having a longitudinal slot extending throughout the entire length of the sleeve, an opening through said sleeve having a larger diameter at one end of the sleeve and a smaller diameter at the other end of the sleeve, a plug having a force fit with said sleeve and having a larger diameter at one end and a smaller diameter at the other end, the larger and smaller diameters of the plug each respectively being larger than the larger and smaller diameters of the sleeve whereby when the sleeve is inserted in an opening in the work and the plug is driven into the sleeve the plug expands the sleeve into tight engagement with the sides of the hole in the work and the plug is locked in the opening in the hollow sleeve due to the force fit and locks the sleeve in expanded position.

7. A rivet comprising a hollow sleeve having a longitudinal slot extending through the wall of the sleeve and throughout the entire length of the sleeve, a plug having a force-fit within said sleeve and having a larger diameter at one end and a smaller diameter at the other end, the larger and smaller diameters of the plug coacting with the inner wall and end of said sleeve when the plug is forced into the sleeve to expand the sleeve into tight engagement with the holes in the sides of the work and to clench the inner end of the sleeve over the work.

ERNEST C. AUSTIN.